United States Patent
Boese et al.

[15] 3,681,609
[45] Aug. 1, 1972

[54] NON-POLLUTION MOTORS INCLUDING CRYOGENIC FLUID AS THE MOTIVE MEANS

[72] Inventors: Harold L. Boese; Thomas R. Hencey, Jr., both of 1509 Strand, Galveston, Tex. 77550

[22] Filed: Dec. 3, 1970

[21] Appl. No.: 94,814

[52] U.S. Cl. ..................290/2, 290/14, 290/16, 290/50, 290/52, 60/36, 180/54 B, 180/66 B
[51] Int. Cl. ...............................................F01k 15/02
[58] Field of Search ....290/2, 14, 16, 50, 52; 320/43, 320/44, 45, 46, 61.2, 68; 60/36; 417/411, 401, 369, 370; 62/7; 310/39, 54, 52, 40, 10; 180/54 B, 66 B

[56] References Cited

UNITED STATES PATENTS

| | | | |
|---|---|---|---|
| 3,061,733 | 10/1962 | Humpal | 290/2 |
| 3,193,751 | 7/1965 | Cadiou | 320/2 X |
| 2,508,397 | 5/1950 | Kane | 290/2 |
| 2,495,745 | 1/1950 | Litton | 290/2 |
| 3,024,366 | 3/1962 | Yanagiamachi | 290/2 |
| 3,530,356 | 9/1970 | Aronson | 320/61 |
| 3,219,831 | 11/1965 | Ray et al. | 290/2 |
| 3,242,345 | 3/1966 | Kimura et al. | 290/2 |
| 2,961,549 | 11/1960 | Ship et al. | 290/52 |
| 3,232,050 | 2/1966 | Robinson et al. | 60/36 |
| 672,256 | 4/1901 | Bobrick | 60/36 |
| 3,124,696 | 3/1964 | Tucker | 60/36 |

*Primary Examiner*—G. R. Simmons
*Attorney*—Carl B. Fox, Jr.

[57] ABSTRACT

Non-pollution motors wherein liquid nitrogen is evaporated to drive a gas motor, the gas motor driving an alternator (electrical generator) the output from which is used to drive an electric drive motor which may be used to propel an automotive vehicle or may be used to drive any other equipment. The electric drive motor is operated at reduced temperature so that its operating characteristics are greatly improved.

8 Claims, 5 Drawing Figures

Harold L. Boese
Thomas R. Hencey, Jr.
INVENTORS

BY Carl B. Fox, Jr.

ATTORNEY

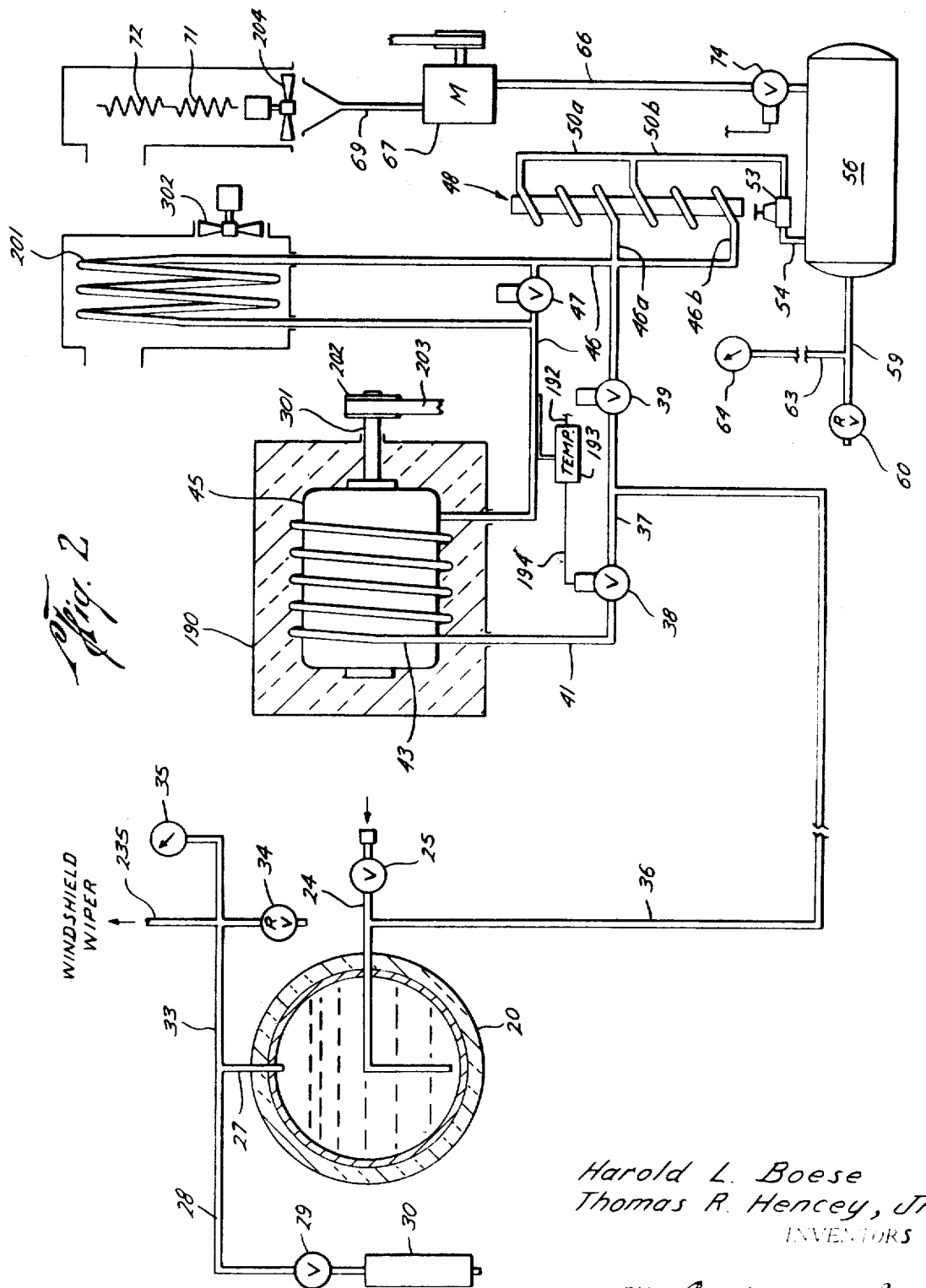

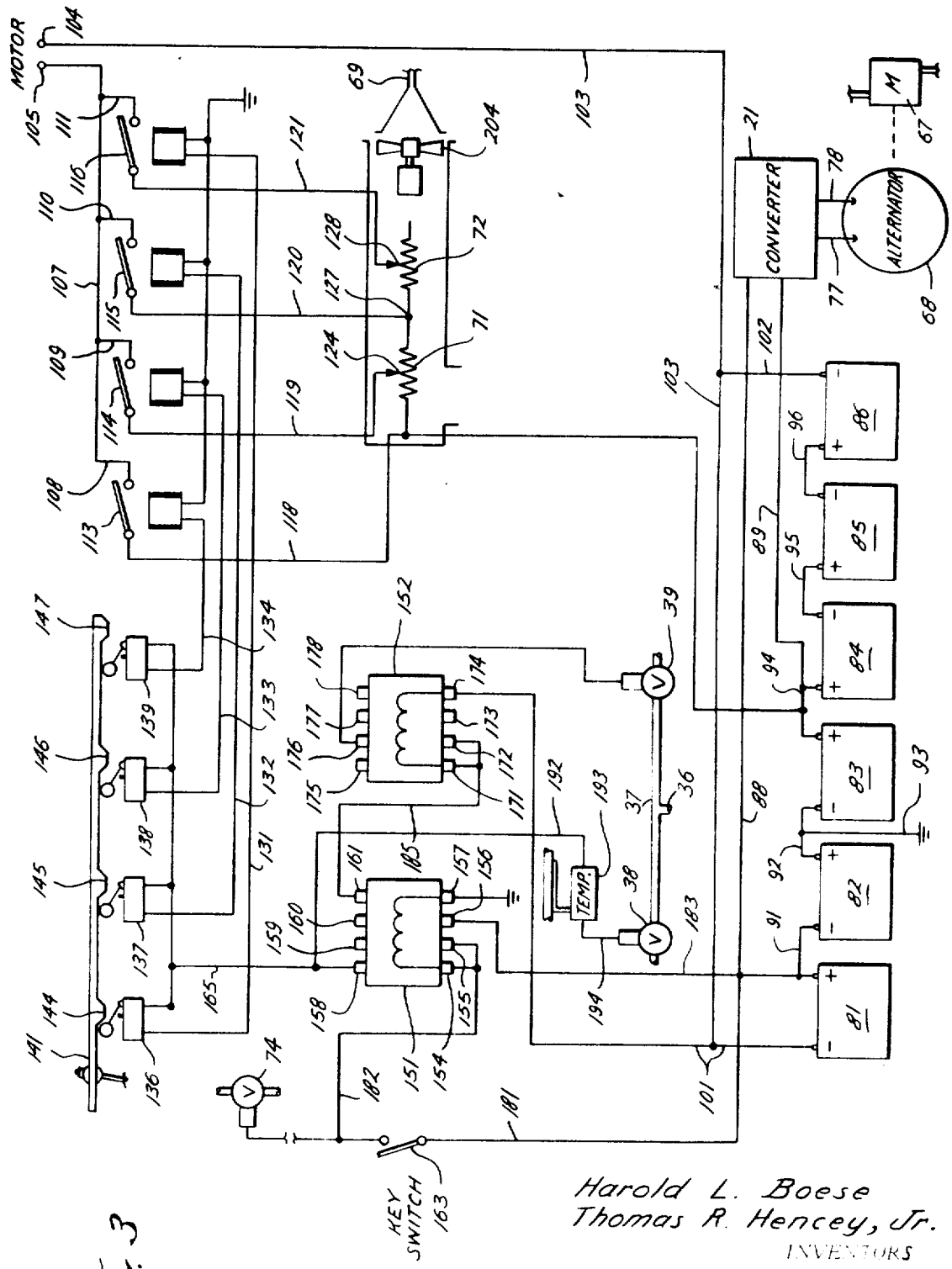

NON-POLLUTION MOTORS INCLUDING CRYOGENIC FLUID AS THE MOTIVE MEANS

SUMMARY OF THE INVENTION

The invention provides non-pollution motors in which liquid nitrogen is employed as fuel, the liquid nitrogen being evaporated to drive a gas motor. The gas motor drives an electric generator, or alternator, the electrical power output from which is used to energize an electric drive motor, which generates the power output of the non-pollution motor. The motor is of variable speed so that it may be employed for propulsion of automotive vehicles, or for other uses requiring variable speed operation. The motor may be made of constant speed design if desired. The motor operation is automatic in character so that the motor may be operated much the same as internal combustion and diesel motors are operated.

The motors afforded by the invention are very economical in operation. For example, when the motors are used to propel automotive vehicles, about 50 miles per gallon of liquid nitrogen may be achieved. The cost of liquid nitrogen is low as compared with the cost of petroleum fuels used in other engines. It is anticipated that vehicles will have far greater operating ranges (distance traveled per filling of the fuel tank) than is customarily achieved with conventionally powered vehicles.

In addition to being useful as a propulsion drive device, the motors afforded according to the invention can be used to supply both heating and cooling, so that a heater and air conditioning unit for an automotive vehicle may be provided in conjunction with the motor employed to drive the vehicle.

The only exhaust gas from the motors is nitrogen vapor. This, of course, may not be breathed by humans and animals, but is not of foul odor and is not an actual poison as are the exhaust gases from conventional engines. Therefore, the safety of operation of motors according to the invention is greatly improved.

The advantages of the motors according to the invention are realized largely because the electric drive motor from which actual power is derived from the non-pollution motor is operated at very cold temperatures. Optimum results have been achieved operating the electric drive motor at temperatures of from about −200° to about −220° F. Other reduced operating temperatures may be employed outside of the optimum range if found to be necessary or desirable, while still maintaining many of the advantages of the invention. The increased electric motor efficiency is realized because the electrical resistances of the motor conductors is vastly reduced at the extremely cold operating temperatures.

Other objects and advantages of the invention will appear from the following detailed description of preferred embodiments thereof, reference during the description being made to the accompanying drawings.

BRIEF DESCRIPTIONS OF THE DRAWINGS

FIG. 2 is a preferred embodiment of flow diagram for a non-pollution motor according to the invention.

FIG. 3 is an electrical circuit diagram for the motor.

DESCRIPTION OF THE PREFERRED EMBODIMENT

Figure 1:
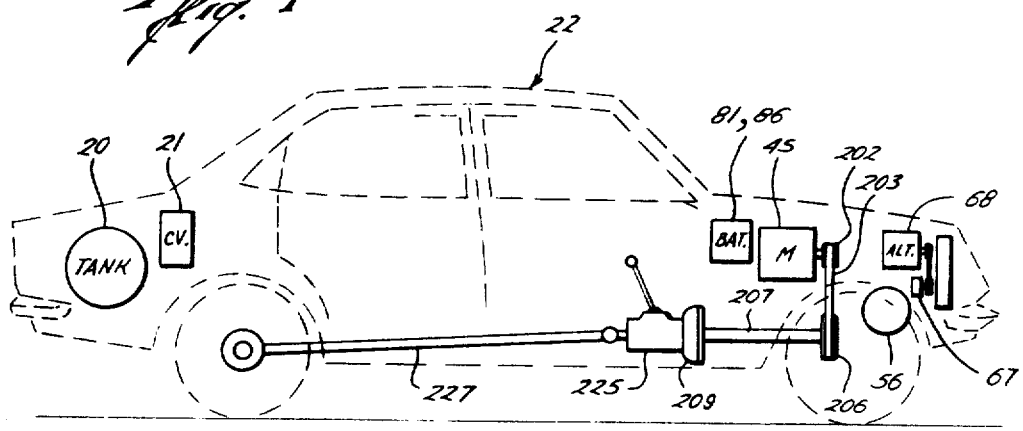
FIG. 1 is a schematic side elevational view, showing an arrangement of non-pollution motor elements in an automotive vehicle.

Referring first to FIG. 1 of the drawings, a fuel tank 20 and an AC to DC battery converter 21 are shown disposed in the trunk storage space of vehicle 22. Other elements referred to later are shown positioned in vehicle 22. The positioning of the elements in the vehicle is subject to variation, and the positioning of each element herein shown is exemplary only.

Referring to FIG. 2, liquid nitrogen fuel is fed into fuel tank 20 through a conduit 24 having closure valve 25, the fuel feed conduit 24 being downturned to open at the lower part of the interior of tank 20. A purge conduit 27 connects to branch conduit 28 which has valve 29 and muffler 30. Valve 29 may be opened to purge gas from tank 20 when the tank is being filled with liquid nitrogen in order to prevent excessive pressure within the fuel tank 20, valve 25 also being open during filling of the tank. Another branch pipe 33, which branches from conduit 27, leads to pressure regulating bleeder valve 34 which is opened when excessive pressure exists in tank 20 in order to insure against rupture of fuel tank 20. Pressure gage 35 indicates pressure in tank 20.

A conduit 36 branches from conduit 24 between tank 20 and valve 25, and leads to convey liquid nitrogen to a conduit 37, at one end of which is provided a solenoid operated valve 38 and at the other end of which is provided a second solenoid operated valve. 39. Conduit 41 from solenoid operated valve 38 is formed into a winding 43 disposed around the case of electric drive motor 45 to cool the motor. From winding 43 serially connected conduit 46 carries the liquid nitrogen through valve 47 to evaporator 48. Evaporator 48 may be an evaporator to which heat is transferred from air passing thereover. The evaporator is shown to be a two-parallel pass evaporator, there being two inlets thereto from conduit 46 denoted by reference numerals 46a, 46b.

Gas from evaporator 48 passes through conduits 50a, 50b through pressure regulating valve 53 and thence through conduit 54 to surge tank 56. From surge tank 56 a conduit 59 leads to pressure regulating valve 60 which provides bleeding of excess pressure gas from the surge tank should excessive pressure develop therewithin. A conduit 63 branching from conduit 59 leads to a pressure indicating meter 64 which may be conveniently mounted on the dashboard of the vehicle if the motor is being employed as a motive power unit for a vehicle.

A conduit 66 conveys pressured gas from surge tank 56 to gas motor 67 which is driven to drive alternator 68, an electrical generator (see FIG. 3) Exhaust gas from gas motor 67 is conveyed through conduit 69 to be blown across resistor coils 71, 72, to be described later. The gas after cooling resistors 71, 72 is exhausted.

Conduit 66 has therein valve, which is solenoid operated, and which is energized to open when an ignition key at the dashboard is turned to the "on" position. Therefore, the motor may not be operated unless the ignition key is inserted in the ignition lock and turned "on," to open valve 74 to permit pressured nitrogen gas to operate gas motor 67.

Alternator 68 is connected by conductor 77, 78 to battery converter 21. The output of alternator 68 is 110 volt alternating current (AC), the converter 21 converts the alternator output to 36 volt direct current (DC). Lead cell storage batteries 81–86, 12 volt, are charged by converter 21 through conductors 88, 89, conductor 88 being connected to the positive terminal of battery 81 and conductor 89 being connected to the positive terminals of batteries 83, 84 at 94.

The positive terminal of battery 81 is connected to the negative terminal of battery 82 by conductor 91. The positive terminal of battery 82 is connected to the negative terminal of battery 83 by conductor 92, which is grounded at 93. The positive terminals of batteries 83, 84 are connected by conductor 94. The negative terminal of battery 84 is connected to the positive terminal of battery 85 by conductor 95. The negative terminal of battery 85 is connected to the positive terminal of battery 86 by conductor 96.

Conductors 101, 102 and 103 connect the negative terminals of batteries 81, 86 to the terminal 104 of motor 45. The other terminal 105 is connected by conductor 107 and branch conductors 108–111 to one terminal of each of switches 113–116. The other terminals of switches 113–116 are connected by conductors 118–121, respectively, to one end of resistor 71, to an intermediate point of resistor 71 at 124, to the conductor connecting the other end of resistor 71 to resistor 127, and to an intermediate point of resistor 72 at 128.

Switches 113–116 are solenoid operated and 24 volt DC electrical current is supplied thereto through conductors 131–134, respectively. Conductors 131–134 are energized respectively by closing of switches 136–139. Switches 136–139 are closed by movements of elongate switch actuator 141, which is longitudinally moved toward the left, as it is depicted in the drawings, by depression of the accelerator pedal 141a and through linkage 141b, and which is biased toward the right by a spring (not shown) which elevates the accelerator pedal. In other words depression, of the accelerator pedal moves switch actuator 141 toward the left, and release of the accelerator pedal causes the spring to move the actuator 141 toward the right.

Actuator 141 has projecting contacts 144–147 which are spaced such that, upon initial depression of the accelerator pedal, contact 144 first depresses the level of switch 136. Further accelerator depression moves actuator 141 further toward the left, and, while contact 144 is still depressing switch 136 to close it, contact 145 closes switch 137. Still further accelerator depression moves actuator 141 still further to the left so that contact 146 closes switch 138, switch 137 remaining closed until after switch 138 has been closed. Still further final depression of the accelerator pedal causes contact 147 to move to the left to depress and close switch 139, this being done while switch 138 remains closed. Each switch of the series, after the first switch, is closed while the preceding switch remains closed, but after the succeeding switch is closed the actuator 141 moves sufficiently so that the next preceding switch is opened. Therefore, accelerator depression moves actuator 141 to close switches 136–139 successively so that switches 113–116 are successively closed in the same order to operate motor 45 at successively increased speeds. If the accelerator is not completely depressed, then the motor will operate at the speed corresponding with whichever of the switches 136–139 and 113–116, respectively, are closed. In other words, closing of switch 113 gives lowest speed to motor 45, and switches 114, 115, 116 give increasingly higher speeds when closed.

Switches 151, 152 are double-pole, double-throw 24 volt switches. Switch 151 has terminals 154–157 and 158–161. Switch 163 is closed when the ignition key is turned on, to energize and close switch 151 and switch 152. One side of each of switches 136–139 is connected by conductor 165 to terminal 158 of switch 151, so that closing of switches 136–139 causes motor 45 operation only when the ignition switch is closed. Switch 152 has terminals 171–174 and 175–178.

Conductors 181, 182 respectively connect one side of switch 163 to a conductor 183 leading from conductor 91 to terminal 156 of switch 151, and the other side of switch 163 to terminals 154–155 of switch 151. Terminal 157 of switch 151 is grounded. Terminals 159–160 of switch 151 are not used. Terminal 161 is connected by a conductor 185 to terminals 171–172 of switch 152. Terminal 173 of switch 152 is not used. Terminal 174 of switch 152 is connected by conductor 101 to the negative terminal of battery 81. Terminals 175, 177 and 178 of switch 152 are not used. Terminal 176 is connected to solenoid valve 39. Switch 152, which as stated is a 24 volt double-pole, double-throw relay switch, is not used as such, but instead is used as a 12 volt sensing relay.

Motor 45 and winding or coil 43 of conduit 41 therearound are completely enclosed within insulation 190, which serves to maintain the motor in very cold condition because of the cooling effect of liquid nitrogen flowing through winding 43. Fuel tank 20 is a cryogenic insulated tank, and liquid nitrogen therein is maintained at elevated pressure, for example, at 130 pounds per square inch. A conductor 192 connects terminal 158 of relay switch 151 to one side of temperature control switch 193, the other terminal of which is connected to the solenoid of solenoid valve 138, by a conductor 194. When the temperature of liquid nitrogen passing out of winding 43 becomes too elevated, temperature control switch 193 is closed to cause opening of solenoid valve 138 so that additional cold liquid nitrogen will flow through the coil 43 to maintain the motor in cold condition. Relay switch 152 opens solenoid valve 39 to cause flow of liquid nitrogen directly to evaporator 48 when the voltage output of the set of batteries 81–86 drops below 12 volts. Therefore, gas motor 67 is caused to operate alternator 68 to charge the set of 12 volt lead cell batteries 81–86 when required.

An air conditioning by-pass coil 201 is provided from conduit 46 around valve 47. As stated, valve 47 may be a temperature control valve to maintain required flow through coil 201, opening when coil 201 is providing more cooling than required and closing when coil 201 is providing less cooling than required. Coil 201 is a heat exchange coil which may be used to air condition a motor vehicle in which the motor system herein disclosed is installed. Fan 202 blows air over coil 201, the cooled air being discharged into the interior of the car to cool the occupants therein. If air conditioning is not provided, the coil 201 may be omitted, in which case valve 47 will be omitted, so that liquid nitrogen will then flow directly through conduit 46 into the evaporator 48.

The resistors 71, 72 which are employed to control the voltage to motor 45 to control its speed, may be used to provide a heating system for an automotive vehicle. The fan or blower 204 may be provided to blow air over the resistors, the air being therefrom passed to the interior of the vehicle to heat it. In this case, the exhaust nitrogen gas from gas motor 67 will be vented and will not pass over coils 71, 72.

The windshield wipers of the vehicle may be operated by gas delivered through conduit 235.

The pressure in surge tank 56 will usually be a pressure up to 150 pounds per square inch. The evaporator temperature will usually be from about 65° to about 70° F. Operating pressures, temperatures, and the like, may be considerably varied throughout the system, while maintaining benefits thereof.

Figure 4:
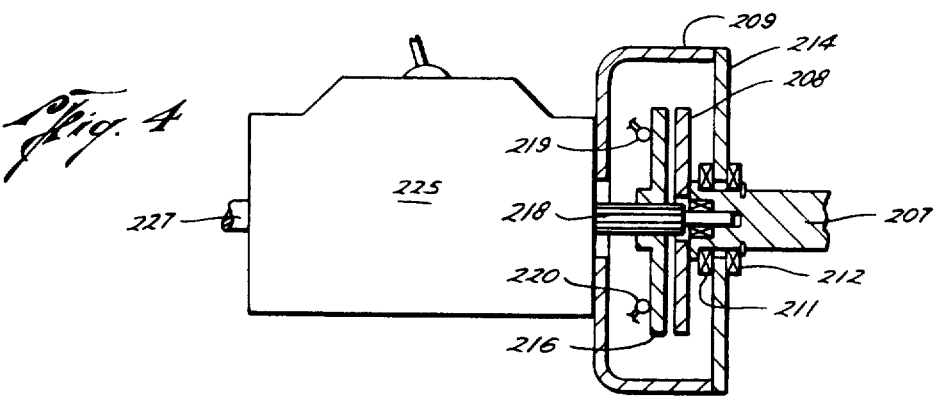
FIG. 4 is a partial cross-sectional view showing a transmission-clutch modification for use in driving an automotive vehicle with a non-pollution motor according to the invention.
Figure 5:
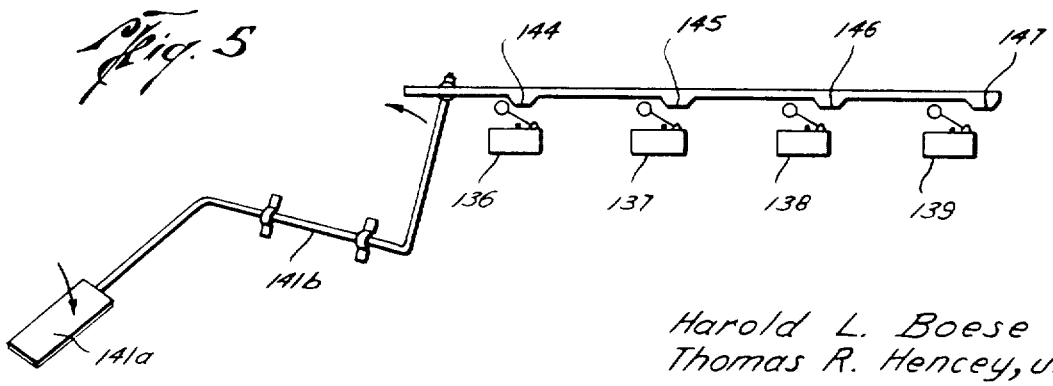
FIG. 5 is a schematic showing of an automotive accelerator linkage for use in connection with the invention.

Motor 45 has shaft 201 on which sheave 202 is carried. Belt 203 engages sheave 206 on rotating shaft 207 (see FIGS. 1 and 4) of vehicle 22, which rotates clutch plate 208 in clutch housing 209. Thrust bearings 211, 212 are provided at opposite sides of end plate 214 to absorb shaft thrust. Clutch plate 216 is moved against plate 208 to rotate shaft 218 by elements 219, 220, in conventional manner. Transmission 225 is plural speed, and is conventional. Drive shaft 227 may be driven in rotation at different speeds, the number of different speeds being four times the number of transmission speed ranges, i.e. the number of speeds of the non-polluting motor times the number of transmission speeds. The transmission and clutch are conventional, except for the modifications to the forward portion of the clutch.

As has been stated, the non-polluting motors afforded by the invention may be employed as power sources in any service, and are not limited to use in automotive vehicles.

While preferred embodiments of the invention have been described and shown in the drawings, many modifications thereof may be made by a person skilled in the art without departing from the spirit of the invention, and it is intended to protect by Letters Patent all forms of the invention falling within the scope of the following claims.

We claim:

1. Non-polluting motor, comprising a source of liquefied cryogenic gas, electric motor means, means for providing heat exchange between liquefied cryogenic gas from said source and said electric motor means whereby said electric motor means is cooled and said liquefied cryogenic gas is heated for evaporation, evaporating means for receiving and evaporating said liquefied cryogenic gas, gas motor means driven by said evaporated gas to drive an electrical generator and the spent gas from said motor means being exhausted, said electric motor means being energized by the output of said electrical generator to provide a mechanical power output from said non-polluting motor.

2. Combination of claim 9, said liquefied cryogenic gas being liquid nitrogen.

3. Combination of claim 2, said electric motor means being maintained at a temperature below about −200° F.

4. Combination of claim 3, including temperature control means for said electric motor means, comprising means for controlling flow of liquid nitrogen for heat transfer from said electric motor means; and including separate means for delivering a controlled flow of liquid nitrogen to said evaporating means.

5. Combination of claim 4, including electric storage battery means for receiving the electrical output of said electrical generator and for energizing said electric motor means to drive the same, and means for controlling the electrical charge of said electric storage battery means automatically by controlling the flow of gas delivered to said gas motor means.

6. Non-polluting motor, comprising a source of liquefied gas, means for heating and evaporating said liquefied gas, gas motor means driven by said evaporated gas to drive an electrical generator, electric motor means energized by the output of said electrical generator to provide a mechanical power output from said non-polluting motor, said electric motor means being cooled by heat transfer to said liquefied gas by said means for heating and evaporating said liquefied gas; said liquefied gas being liquid nitrogen; said electric motor means being cooled to a temperature in the range from about −200° F. to about −232.8° F.; including temperature control means for said electric motor means, comprising means for controlling flow of liquid nitrogen for heat transfer from said electric motor means; and including separate means for delivering a controlled flow of liquid nitrogen to said evaporating means; including electric storage battery means for receiving the electrical output of said electrical generator and for energizing said electric motor means to drive the same, and means for controlling the electrical charge of said electric storage battery means automatically by controlling the flow of gas delivered to said gas motor means; including switch means energized by said electric storage battery means for controlling electric power input to said electric motor means for controlling the operating speed thereof.

7. Combination of claim 6, said non-polluting motor being mounted in an automotive vehicle, clutch means disposed to propel said vehicle when engaged to do so, and means for transmitting driving force to said clutch means from said electric motor means.

8. Combination of claim 6, said non-polluting motor means being mounted in an automotive vehicle, and releasable means for transmitting driving force from said motor means to at least one wheel of said vehicle.

* * * * *

UNITED STATES PATENT OFFICE
CERTIFICATE OF CORRECTION

Patent No. 3,681,609     Dated August 1, 1972

Inventor(s) HAROLD L. BOESE ET AL

It is certified that error appears in the above-identified patent and that said Letters Patent are hereby corrected as shown below:

Column 2, line 39, cancel the period "." after "valve" at end of line. Column 3, line 1, after "valve" insert -- 74 --; line 8, "conductor" should read -- conductors --; line 37, before "127" insert -- 72 at --; line 55, "level" should read -- lever --; column 5, line 4, "202" should read -- 302 --; line 27, "201" should read -- 301 --; Column 6, line 7, "9" should read -- 1 --.

Signed and sealed this 15th day of May 1973.

(SEAL)
Attest:

EDWARD M. FLETCHER, JR.
Attesting Officer

ROBERT GOTTSCHALK
Commissioner of Patents